(12) United States Patent
Speth et al.

(10) Patent No.: US 6,206,391 B1
(45) Date of Patent: Mar. 27, 2001

(54) REAR SUSPENSION USING A TORSIONAL SPRING INTEGRAL WITH TRAILING ARM

(75) Inventors: David G Speth, Sylvan Lake; Del C Schroeder, Bloomfield Hills; James C Rich, White Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/466,577

(22) Filed: Dec. 17, 1999

(51) Int. Cl.[7] .................................................. B60G 3/12
(52) U.S. Cl. ............................ 280/124.128; 280/124.13; 280/124.133; 280/124.167; 280/124.177
(58) Field of Search .................. 280/124.128, 124.13, 280/124.131, 124.133, 124.153, 124.166, 124.167, 124.169, 124.177, 124.178

(56) References Cited

U.S. PATENT DOCUMENTS

| | | |
|---|---|---|
| 2,148,029 | 2/1939 | Matthews . |
| 2,226,406 | 12/1940 | Krotz . |
| 2,260,634 | 10/1941 | Mullner . |
| 2,286,609 | 6/1942 | Ledwinka . |
| 2,409,500 | 10/1946 | Krotz . |
| 2,450,506 | 10/1948 | Flogaus . |
| 2,804,732 | 9/1957 | Brockley . |
| 2,954,835 * | 10/1960 | Janeway ............................... 180/353 |
| 3,006,627 | 10/1961 | Paulsen . |
| 3,193,303 * | 7/1965 | Allison et al. ................. 280/124.165 |
| 3,331,627 | 7/1967 | Schroder et al. . |
| 3,371,940 | 3/1968 | Sinclair et al. . |
| 3,402,940 | 9/1968 | Castelet . |
| 3,436,069 | 4/1969 | Henschen . |
| 3,545,737 | 12/1970 | Lamprey et al. . |
| 3,674,285 * | 7/1972 | Grosseau .............................. 280/724 |
| 3,779,576 | 12/1973 | Malcolm . |
| 4,043,417 | 8/1977 | Orpana . |
| 4,473,238 | 9/1984 | Antoine . |
| 4,580,808 | 4/1986 | Smith-Williams . |
| 4,625,995 | 12/1986 | Aubry et al. . |
| 4,695,073 | 9/1987 | Pettibone et al. . |
| 4,707,020 | 11/1987 | Enokida et al. . |
| 4,830,396 | 5/1989 | Gandiglio . |
| 5,009,463 | 4/1991 | Saitoh et al. . |
| 5,080,389 | 1/1992 | Kawano et al. . |
| 5,411,285 | 5/1995 | Lee . |

FOREIGN PATENT DOCUMENTS

| | | |
|---|---|---|
| 628328 | 8/1949 | (GB) . |
| 628330 | 8/1949 | (GB) . |
| 1237615 | 6/1971 | (GB) . |
| 2207975A | 2/1989 | (GB) . |

* cited by examiner

Primary Examiner—Paul N. Dickson
Assistant Examiner—Faye M. Fleming
(74) Attorney, Agent, or Firm—Kenneth H. Maclean

(57) ABSTRACT

A vehicle suspension system is provided including a trailing arm which is adapted to be pivotally connected to a frame of the vehicle. A wheel assembly is mounted to a first end of the trailing arm and a torsion element is integrally mounted within the trailing arm. A crank arm is provided having a first end mounted to the torsion element and a second end which is substantially fixed against movement in a vertical direction. As the trailing arm moves in a vertical direction, the crank arm provides torsion to the torsion element which acts as a spring for the vehicle suspension. By substantially mounting the entire suspension system directly below the vehicle frame rails, increased space is available between the wheels for luggage, fuel and spare tire storage. The rear suspension package is substantially reduced in both size and weight.

6 Claims, 2 Drawing Sheets

REAR SUSPENSION USING A TORSIONAL SPRING INTEGRAL WITH TRAILING ARM

FIELD OF THE INVENTION

The present invention relates generally to vehicle suspensions systems, and more particularly to a rear suspension system using a torsional spring integral with a trailing arm.

BACKGROUND

The suspension system of an automobile allows the automobile to drive smoothly over a bumpy surface. The wheels may jolt up and down, but the suspension system between the wheel assemblies and the body and frame of the vehicle flex and take up the force of the jolt. The suspension system insures that the force of the jolt does not transfer to the vehicle and its occupants. Springs alone produce a bouncing motion, so the suspension system also contains dampers, commonly known as shock absorbers. The shock absorbers slow the movement of the springs to prevent the car and its occupants from bouncing up and down.

Many types of springs have been utilized in the automotive industry in numerous configurations. In particular, coil springs have been utilized in smaller vehicles which have a coil spring and shock absorber attached to each wheel. The spring and shock absorber are fixed between the car body and the wheel struts.

Larger vehicles often utilize heavy-duty leaf springs and shock absorbers to cushion the ride. The leaf spring is a stack of steel strips slightly curved so that the spring straightens when the vehicle is loaded. The ends of the spring are fixed to the vehicle frame or body and the shock absorber is fixed between the axle and the vehicle body.

Torsion bars are steel rods that act like a spring to take up a twisting force. If the bar is forced to twist in one direction, it resists the movement and then twists back when the force is removed. Many cars contain an anti-roll bar fixed between the front axles. This rotates as the wheels go up and down. If the car begins to rollover on a tight corner, the anti-roll bar prevents the roll from increasing.

Each of the above-spring systems which are utilized in various vehicle suspensions have different mounting requirements. In particular, the use of coil springs between a strut and a vehicle body requires that the vehicle body be substantially rigid in the location of the connection to the coil spring. In addition, the space required for a vertical coil spring and shock absorber assembly can greatly limit the design flexibility for a vehicle. The use of leaf springs and torsion bars also have design limitations and restrictions which may require frame cross members which restrict the space available for luggage, fuel tank, spare tires, etc. Accordingly, it is desirable in the automotive industry to provide a suspension system which is compact and allows for greater vehicle design flexibility.

SUMMARY OF THE INVENTION

Accordingly, it is an object of the present invention to provide a vehicle suspension system which is light weight, compact, inexpensive, and easy to manufacture.

These and other objects are obtained by providing a suspension system including a trailing arm pivotally connected to a frame rail of the vehicle. A wheel assembly is mounted to a first end of the trailing arm and a torsion element is mounted in the trailing arm. A crank arm is provided having a first end mounted to the torsion element and a second end which is attached to a link which is attached to the vehicle frame. As the wheel moves up and down, the vertical motion of the trailing arm is converted to a torsional load on the torsion element disposed within the trailing arm.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
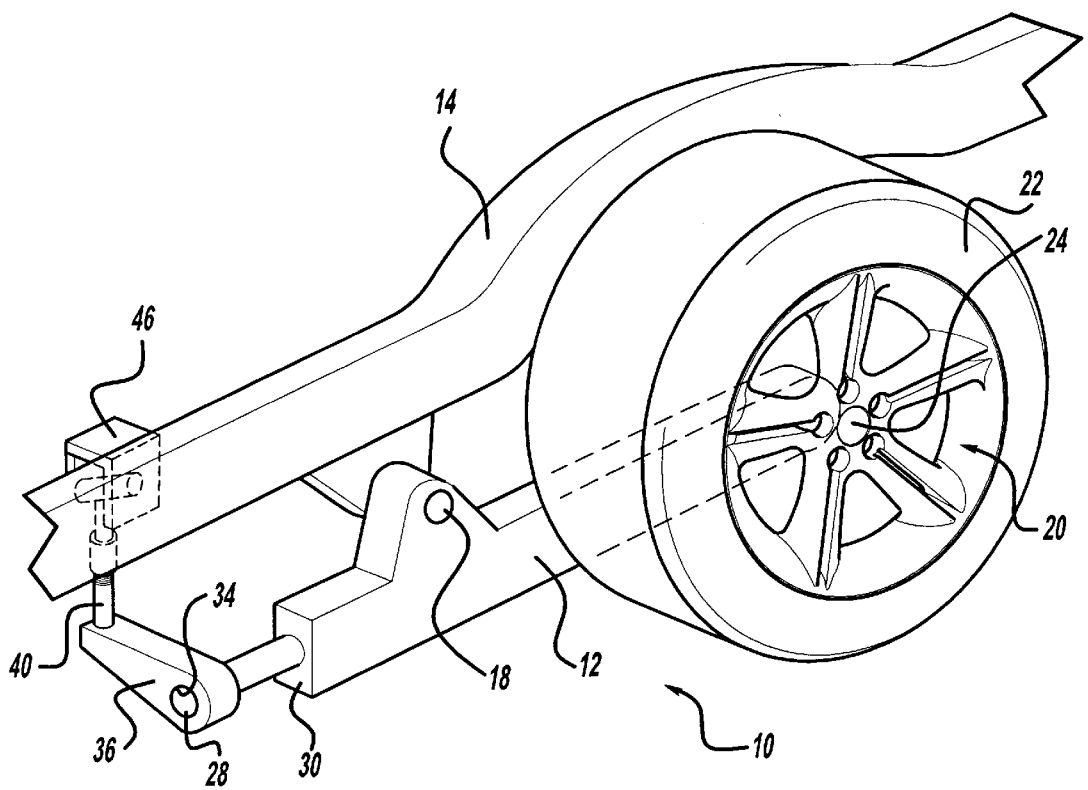
FIG. 1 is perspective view of the rear suspension system according to the principals of the present invention.
Figure 2:
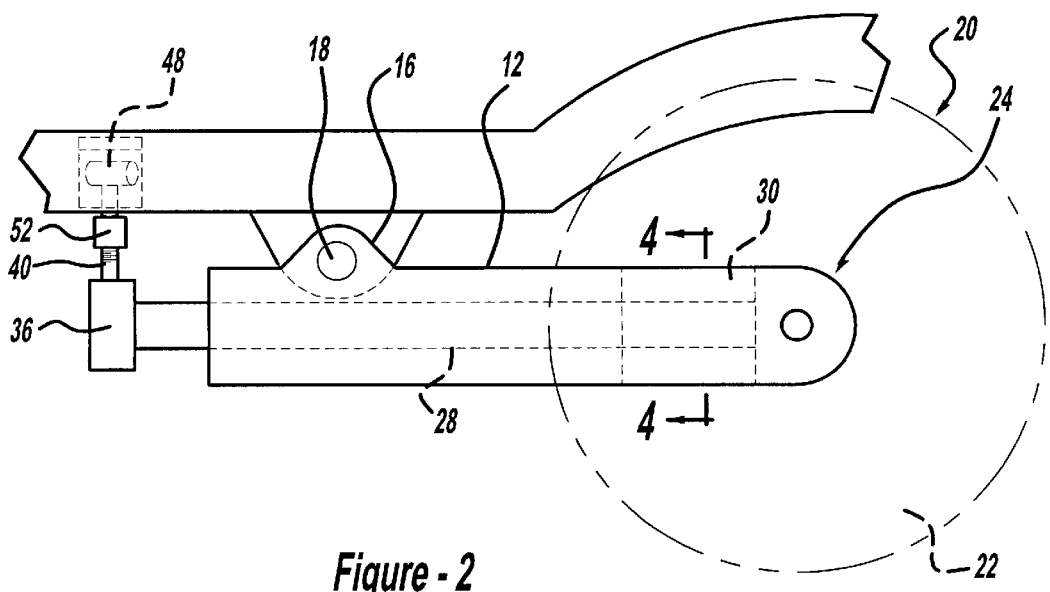
FIG. 2 is a side view of the rear suspension system according to the principals of the present invention.
Figure 3:
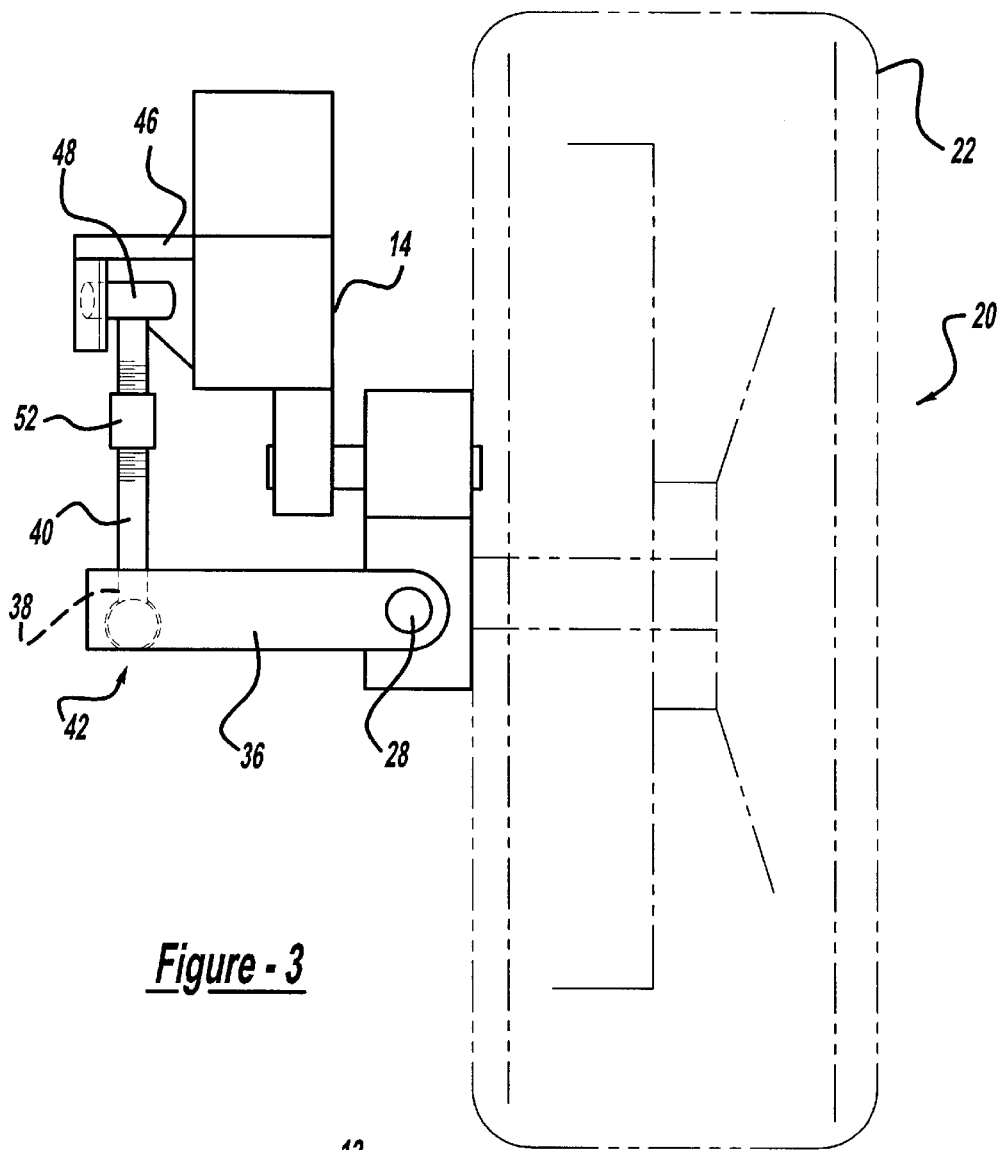
FIG. 3 is a front view of the rear suspension according to the principals of the present invention.
Figure 4:
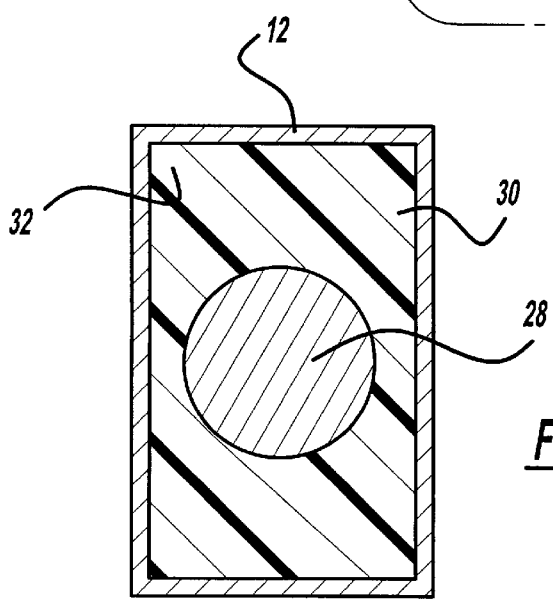
FIG. 4 is a cross-sectional view taken along line 4-4 of FIG. 2.

With reference to FIGS. 1–4, the rear suspension system 10 according to the principals of the present invention will now be described. The rear suspension system 10 includes a trailing arm 12 which is pivotally mounted to a vehicle frame rail 14. The pivotal connection between the trailing arm 12 and the frame rail 14 includes a pivot bracket 16 extending vertically downward from the frame rail 14 and connected to the trailing arm 12 by a pivot rod 18. A wheel assembly 20 including a tire 22 is connected to a first end of the trailing arm 12 by a spindle assembly 24. A torsion element 28 is mounted within a hollow chamber disposed in the trailing arm 12. The torsion element 28 can be a torsion bar, rubber torsion spring and shaft assembly, or other similar device. In the embodiment shown, the torsion element 28 is embedded in a rubber spring member 30 which is press fit, bonded or supported within the hollow end portion of the trailing arm 12. The rubber spring member 30 is tightly held within the hollow portion 32 formed in the trailing arm 12.

The torsion element 28 has a second end provided with a splined portion for mating with a splined hole 34 provided in a crank arm 36. The crank arm 36 is provided with a mounting hole 38 for receiving a pivot bolt 40. The pivot bolt 40 is connected to the crank arm 36 by a spherical pivot assembly 42 at a first end thereof and to a retainer bracket 46 at a second end thereof. A pivotable bushing assembly 48 is provided for connecting the second end of the pivot bolt 40 to the retainer bracket 46.

During operation, the trailing arm 12 with the integral torsion element 28 pivots about pivot pin 18 supported from the frame rail structure. The vertical motion at the second end of the trailing arm 12 is converted to a torsional load on the torsion element within the rubber spring member 30 via the crank arm 36 and pivot bolt 40 which prevents a corresponding vertical movement of the second end of the crank arm 36. The pivot nut 38 allows the pivot bolt 40 attached to the second end of the crank arm 36 to move laterally so that the trailing arm 12 can pivot upward and downward. The ride height of the vehicle can be adjusted by changing the length of the pivot bolt 40. In addition, the length of the pivot bolt 40 may be provided with an adjustable turn buckle 52 adjusted by known manual, electrical and hydraulic adjustment means.

The trailing arm rear suspension system according to the present invention is a compact suspension system which is tailored for small vehicles. The suspension system is ideal for economy-sized vehicles where space and weight are considered a premium. The torsion rod spring is integral with the trailing arm, eliminating cross-vehicle members and freeing space between the vehicle wheels. By integrating the torsion rod spring with the trailing arm and eliminating the necessity for special vehicle cross-members associated with the suspension system, the amount of usable space available between the wheels is increased for luggage, fuel and spare tire storage. The rear suspension system of the present invention is substantially reduced in both size and weight as compared with conventional suspension systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle suspension system, comprising:
   a trailing arm pivotally connected to a frame of the vehicle;
   a wheel assembly mounted to a first end of said trailing arm;
   a torsion element mounted within said trailing arm; and
   a crank arm having a first end mounted to said torsion element and a second end which is substantially fixed against movement in a vertical direction.

2. The suspension system according to claim 1, wherein said second end of said crank arm is adapted to be connected to the vehicle frame.

3. The suspension system according to claim 2, wherein said second end of said crank arm is adapted to be connected to the vehicle frame by a pivot bolt.

4. The suspension system according to claim 3, wherein said pivot bolt is adjustable to adjust vehicle ride height.

5. The suspension system according to claim 1, wherein said torsion element has an end portion embedded in a rubber spring member disposed inside a hollow portion of said trailing arm.

6. The suspension system according to claim 1, wherein said second end of said crank arm is adjustably mounted to said frame.

* * * * *